United States Patent [19]

Mühlberger

[11] 4,426,426
[45] Jan. 17, 1984

[54] WELDING ALLOY AND METHOD

[76] Inventor: Horst Mühlberger, Staufenstrasse 29, D-6000 Frankfurt/Main 1, Fed. Rep. of Germany

[21] Appl. No.: 400,671

[22] Filed: Jul. 22, 1982

[51] Int. Cl.³ .................... C22C 37/10; B22D 19/00; B32B 15/00; B23K 9/00
[52] U.S. Cl. .................... 428/682; 219/137 WM; 219/146.23; 219/146.51; 219/146.41; 428/925; 228/263.14; 228/263.15; 164/96; 75/124; 75/125
[58] Field of Search ............ 75/123 L, 124 E, 124 F, 75/128 C, 128 W, 125; 428/681, 682, 925; 164/95, 96; 228/263.14, 263.15; 219/137 WM, 146.23, 146.51, 146.41

[56] References Cited

U.S. PATENT DOCUMENTS

| | | | |
|---|---|---|---|
| 1,352,534 | 9/1920 | Russell | 75/123 L |
| 2,354,147 | 7/1944 | Scott | 75/123 L |
| 3,855,018 | 12/1974 | Salsgiver et al. | 75/123 L |
| 3,929,522 | 12/1975 | Salsgiver et al. | 75/123 L |
| 3,935,038 | 1/1976 | Shimoyama et al. | 75/123 L |
| 4,078,952 | 3/1978 | Malagari | 75/123 L |
| 4,338,143 | 7/1982 | Shimoyama et al. | 75/123 L |

FOREIGN PATENT DOCUMENTS

| | | | |
|---|---|---|---|
| 46-26213 | 7/1971 | Japan | 75/123 L |
| 46-4859042 | 11/1971 | Japan | 75/123 L |

*Primary Examiner*—L. Dewayne Rutledge
*Assistant Examiner*—Debbie Yee
*Attorney, Agent, or Firm*—Karl F. Ross; Herbert Dubno

[57] ABSTRACT

Spheroidal graphite cast iron body can be welded using a welding alloy whose carbon diffusion rate is sufficiently high that cementite formation is prevented. The alloy has essentially the following composition:
less than 0.2% manganese,
less than 2.0% carbon,
2.5 to 3.2% silicon,
up to 1.0% copper,
up to 0.5% molybdenum,
up to 2% aluminum,
up to 30% nickel,
up to 0.1% tungsten,
up to 0.1% chromium,
up to 0.1% vanadium, magnesium and/or rare earth elements in an amount up to and sufficient to promote the formation of graphite spherolites upon cooling, and
balance substantially iron.

7 Claims, No Drawings

WELDING ALLOY AND METHOD

FIELD OF THE INVENTION

My present invention relates to a welding alloy and method and, more particularly, to an iron-base alloy for autogenous and electrical welding of components at least one of which may be composed of a cast iron with spheroidal graphite.

BACKGROUND OF THE INVENTION

The term "welding alloy" is here used to refer to a metal which is adapted to be utilized in conjunction with a welding process and is to be joined at least in part to a body of spheroidal graphite cast iron.

The welding alloy may be in the form of welding wire or rod, i.e. wire or rods which can strike an arc so that material from the wire or rod is deposited as a weldment on or adjacent the spheroidal graphite cast iron. It may be provided as a filler metal which is melted by an arc or torch, or heat generated by some other means. It may be a transition piece which is connected by welding or metallic bonding to a spheroidal graphite cast iron body.

In all cases the iron-based alloy of the invention is utilized in autogenous and electrical welding of components, at least one of which is composed of the nodular cast iron.

Connection welds of workpieces and structural elements which may include or are constituted by nodular cast iron bodies are common to join such bodies together or to weld such bodies to cast steel, forging steel or other steel-based materials.

Whenever welding is carried out for such purposes and under these conditions, a problem arises when the excess carbon from the graphite nodules is dissolved in the iron, e.g. the welding pool, and because of rapid cooling of the latter, induces the formation of cementite in the welding zone.

Cementite has a higher hardness than the surrounding area which may be detrimental for further processing and introduces a range of undesired properties into the weld region.

For one thing, such a weld can only be worked by grinding, which itself is a disadvantage, limiting utility of the process.

Another disadvantage is that the mechanical properties in the weld region are largely unpredictable or vary from place to place.

German Pat. No. 1,184,186, Swiss Pat. No. 441,953 and Austrian Pat. No. 263,479 are all directed to the development of weld materials and processes which prevent the formation of cementite in the weld region.

It has been found, however, that the use of these welding materials and techniques is only effective under a very limited set of conditions and circumstances, i.e. the techniques do not have universal applicability. As a practical matter they can only be effective when practiced by highly skilled and specially trained personnel, which is a serious drawback.

Furthermore, the connecting welds have workpieces and structural components of nodular cast iron which, in accordance with the teachings of the art, cannot be used as strengthening welds.

OBJECTS OF THE INVENTION

It is the principal object of the present invention to provide an improved weld material, especially for autogenous or electrical welding where this material is to contact at least one spheroidal graphite or nodular cast iron body, whereby disadvantages of earlier materials are obviated and, in particular, the formation of cementite in the weld region is prevented or minimized.

Another object of the invention is to provide a method of welding which can be capable of minimizing cementite formation and which can be carried out under more or less normal welding conditions in spite of the fact that at least one of the workpieces or bodies involved is composed of nodular or spheroidal graphite cast iron.

Yet another object of the invention is to provide an iron-base alloy for use in the welding of spheroidal graphite cast iron by autogenous or electrical welding under normal welding conditions by personnel with only conventional training.

DESCRIPTION OF THE INVENTION

These objects which will become apparent hereinafter are attained, in accordance with the present invention, with a low manganese, limited-carbon, silicon steel, such an alloy being adapted to be used as a filler material, welding rod or welding-junction member for autogenous and electric arc welding without the detrimental formation of cementite and without special conditions or training, in spite of the fact that at least one of the bodies involved in the welding operation is a spheroidal graphite cast iron.

According to the invention, this iron-based alloy has a manganese content less than 0.2% by weight, a carbon content less than 2.0% by weight, and contains silicon in an amount of 2.5 to 3.2% by weight. In addition, the alloy contains copper in an amount up to 1.0% by weight and molybdenum in an amount up to 0.5% by weight, the balance being iron.

Especially effective results are obtained when the manganese content is less than 0.1% and the silicon content is 2.8 to 2.9% by weight.

While the effects of the alloy of the invention are not completely understood, as far as the welding of spheroidal graphite cast iron by electric arc or autogenous welding is concerned, I have found that the welding alloy of the invention has a chemical composition such that any unavoidably solubilized spheroidal graphite during the course of the welding process does not tend to form cementite, but rather is precipitated in the form of spheroidal graphite during the cooling of the weld bead.

Furthermore, the composition of the alloy serving as weld material is such that even when it is cooled at extremely high speeds, such that the formation of the graphite spherulites could not be expected to be reformed, cementite is not produced but rather the hardened composition has a substantially bainitic structure.

The bainite-containing weld bead can be readily machined by practically any conventional material removal technique, e.g. turning, milling, shaping or scraping, although it can also be ground if desired.

In spite of its improved machinability over a cementite-containing bead, it has high strength and a high ductility and elongation, both of which are important for reinforcing or strengthening welds.

The steel, which is treated so that it is carbonized to a lesser degree than may be usually the case, has a silicon content which is elevated and a manganese content reduced or limited so that the diffusion speed of carbon in the liquid metal (and hence the pool of weld metal) is maximized, thereby facilitating the formation of spheroidal graphite. Cementite consequently does not result and the characteristics of the weld seam after cooling are improved.

The production of the low manganese silicon steel alloy of the invention can be effected by the blowing of Sorel iron to burn up part of the carbon in the blowing stage and bring the carbon content below 2% by weight.

It is also possible to produce the low manganese silicon steel by subjecting pig iron to an oxygen refining treatment which not only removes carbon but also manganese to bring the composition within the manganese and carbon limits of the composition of the present invention.

After the removal of manganese and/or carbon by the refining operation, silicon is added to the melt, preferably in the form of ferrosilicon. Copper and molybdenum can be added, as desired, so that perlite formation during cooling or bainite formation with very high speed cooling can result. Both of these latter structures bind the carbon and thus suppress the formation of cementite.

These results are surprising since molybdenum generally is recognized as a carbide former. It is, therefore, surprising that molybdenum and nickel added to the melt can trigger or improve bainite formation when the cooling rate is so great that there is the danger of cementite formation.

The bainite can decompose into needle-like ferrite crystals with carbide inclusions either automatically upon cooling of the weld seam or upon the heating thereof to relatively low temperatures, should such bainite happen to form in the weld seam.

When the alloy of the invention is to be fabricated in the form of a weld wire, e.g. as a weld filler wire for autogenous welding, or as a welding electrode, the drawing of the alloy into the wire form can encounter difficulty because of the high silicon content.

I have found that the incorporation of 0.1 to 2% by weight, preferably from 0.2 to 0.3% by weight aluminum, with a corresponding reduction in the silicon content can facilitate drawing.

I have also found that it is possible to vary the melting point of the alloy of the invention over a comparatively wide range by a corresponding variation of the nickel content from 0 to a maximum of 30% by weight.

Even with 1 to 3% by weight nickel in the alloy, it is possible to form a weld bead having the desirable characteristics mentioned, preferably without requiring the heat treatment after welding.

The alloy can also contain magnesium and/or rare earth elements in amounts adapted to promote the formation of graphite spherulite.

The alloy of the invention can be fabricated in the form of rods for autogenous welding and/or as electrodes for electric arc weld, as wire for the purposes described and for use in welding machines to which the wire is fed from spools or the like.

The alloy can also be put up in various forms, e.g. as strip, bar or other shaped members, e.g. for inclusion in molds into which the spheroidal graphite cast iron is cast to provide transition members bonding to the cast iron.

The transition piece composed of spheroidal graphite cast iron and a body of the alloy according to the invention, enables the bonding of the cast iron to normal steel via the alloy and, nevertheless, provides a metallic bond between the alloy and the cast iron body and any other body to which the cast iron piece is affixed.

The alloy of the invention thus has a chemical composition which enables its use in welding to be effected without special training or even special care, in spite of the fact that one of the bodies is a spheroidal graphite cast iron. Special training is not required, nor is it necessary to provide heat treatment of the products after welding or the precursors before welding. Nor is it necessary that the cooling of the weld be carefully controlled. Thus, the weldment can be cooled quickly or slowly as may be convenient.

The alloy can also be put up as a powder for addition to a pool of weldment.

Preferably the alloy contains:
less than 0.1% by weight manganese,
less than 1.0% by weight carbon,
between 2.8 and 2.9% by weight (inclusive) silicon, 0.6 to 0.8% by weight copper,
about 0.25% by weight molybdenum and, in any event preferably more than 0.1% by weight thereof, and up to 20% by weight nickel with the most preferred composition having 1 to 3% by weight.

I have found that chromium from the tungsten and vanadium, generally unavoidable impurities in the alloys should be present in amounts less than 0.1% by weight, while the magnesium and/or rare earth can be present in amounts which promote the formation of graphite in spherulitic form on hardening of the weld seam.

At the concentrations indicated, molybdenum, which normally acts as a carbide former, has surprisingly been found to act as a cementite suppressant. Together with the nickel, it promotes the formation of bainite, which, as already noted, decomposes by itself during welding or can be decomposed by simply heating the weld to a temperature of 400° to 500° C. if it should appear to remain in the weld bead.

EXAMPLE

An excellent welding alloy (by weight) is of the following compositions:
0.05% Mn
0.85% C
2.85% Si
0.70% Cu
0.25% Mo
2.00% Ni
0.05% Cr
0.05% W
0.05% V
up to 0.1% Ce or La
up to 0.1% Mg
balance iron.

The solidified billet is drawn into welding rod and used autogenous for welding of spheroidal graphite cast iron bodies.

I claim:

1. A welding member in a form for generating a weldment welding to a spheroidal graphite cast iron body, said member consisting by weight of an alloy of the following composition:
less than 0.1% manganese,
less than 1.0% carbon,
2.8 to 2.9% silicon,
0.6 to 0.8% copper,
0.1 to 0.25% molybdenum, 0.2 to 0.3% aluminum 1 to 3% nickel, up to 1% tungsten, up to 0.1% chromium, up to 0.1% vanadium, magnesium and/or rare earth elements in an amount up to and sufficient to promote the formation of graphite spherulites upon cooling, and balance substantially iron.

2. The autogenous welding or electric arc welding rod composed of the alloy defined in claim 1.

3. A welding wire composed of the alloy defined in claim 1.

4. A member consisting essentially of the body of spheroidal graphite cast iron as defined in claim 1 and a transition body of said alloy metallically bonded to said body of cast iron and connected therewith by casting the cast iron body against said body of said alloy.

5. The member defined in claim 4 wherein said alloy body has a wall thickness and dimension such that, upon the casting of said cast body thereagainst, a normal steel can be welded to said member at said alloy body.

6. A method of making a transition piece for the welding of normal steel to a cast body which comprises the steps of:

preforming an alloy body of the alloy defined in claim 1; and casting a spherolitic cast iron body in a mold in contact with said alloy body to form a metallic bond between said alloy body and the resulting spheroidal graphite cast iron body.

7. A method of welding which comprises the steps of forming a pool of an alloy as defined in claim 1 adjacent a spheroidal graphite cast iron body and cooling said pool.

* * * * *